United States Patent [19]

Leveque et al.

[11] Patent Number: 4,927,609
[45] Date of Patent: May 22, 1990

[54] RECOVERY OF GALLIUM/RARE EARTH VALUES FROM OXIDE MIXTURES THEREOF

[75] Inventors: Alain Leveque, Paris; Michel Triollier, Gouvieux, both of France

[73] Assignee: Rhone-Poulenc Industries, Paris, France

[21] Appl. No.: 772,672

[22] Filed: Sep. 5, 1985

Related U.S. Application Data

[63] Continuation of Ser. No. 670,061, Nov. 9, 1984, abandoned, which is a continuation-in-part of Ser. No. 360,559, Mar. 22, 1982, abandoned, which is a continuation of Ser. No. 162,492, Jun. 24, 1980, abandoned.

[30] Foreign Application Priority Data

Jul. 3, 1979 [FR] France ............................ 79 17212

[51] Int. Cl.$^5$ ............................................ C01F 17/00
[52] U.S. Cl. .................... 423/21.5; 423/112; 423/DIG. 14
[58] Field of Search ............. 423/21.5, 112, DIG. 14; 75/101 BE

[56] References Cited

U.S. PATENT DOCUMENTS

| | | | |
|---|---|---|---|
| 3,575,687 | 4/1971 | Drobnick et al. | 423/21.5 |
| 3,582,263 | 6/1971 | Chiola et al. | 423/21.5 |
| 4,029,733 | 6/1977 | Faugeras et al. | 423/24 |
| 4,041,125 | 8/1977 | Alstad et al. | 423/21.5 |

FOREIGN PATENT DOCUMENTS

| | | | |
|---|---|---|---|
| 45-25580 | 8/1970 | Japan | 423/112 |
| 4042765 | 11/1974 | Japan | 423/112 |

OTHER PUBLICATIONS

Habashi, F. "Principles of Extractive Metallurgy", vol. 2, Gordon and Bresch, N.Y., 1970, pp. 347–370 and 385–388.

Primary Examiner—Robert L. Stoll
Attorney, Agent, or Firm—Burns, Doane, Swecker & Mathis

[57] ABSTRACT

Gallium and rare earth values are recovered from oxide mixtures thereof by acidulating/dissolving such admixtures in an acid medium, and then liquid/liquid extracting the resulting solution and ultimately recovering said values from the phases which separate. The subject process is advantageously applied, for example, to the recovery of gallium and gadolinium from the waste fines resulting from the production of the garnets $Gd_3Ga_5O_{12}$.

81 Claims, 1 Drawing Sheet

RECOVERY OF GALLIUM/RARE EARTH VALUES FROM OXIDE MIXTURES THEREOF

CROSS-REFERENCE TO RELATED APPLICATION

This application is a continuation of application Ser. No. 670,061, filed Nov. 9, 1984, now abandoned, which is a continuation-in-part of Ser. No. 360,559, filed Mar. 22, 1982, now abandoned, which in turn is a continuation of Ser. No. 162,492, filed June 24, 1980, now abandoned.

BACKGROUND OF THE INVENTION

1. Field of the Invention

The present invention relates to a process for the treatment of particulate admixtures of rare earth oxides and gallium oxides, and, more especially, relates to the recovery of gallium and rare earth values from mixed oxides thereof, e.g., from the waste fines which result upon production of garnets, by acidulation/dissolution of such admixtures, followed by liquid/liquid extraction, phase separation and ultimate recovery.

2. Description of the Prior Art

It is currently virtually impossible to produce gallium/rare earth garnets in yields in excess of 40%. This is due to the large number of off-standard garnets, namely, crucible residues, cutting residues and polishing residues, i.e., waste fines. The recovery of the raw starting materials originating from these various sources constitutes a most significant problem in view of the cost of the gallium oxides and the rare earth oxides.

SUMMARY OF THE INVENTION

Accordingly, a major object of the present invention is the provision of an improved process for the treatment of mixtures of rare earth oxides and gallium oxides, enabling, on the one hand, the recovery of gallium, and on the other hand the recovery of the rare earths, in very high yields and, in certain cases, very high in purity.

Briefly, the present invention features a process for the treatment of particulate admixtures of rare earth oxides and gallium oxides, characterized in that such mixture is dissolved in acid, the gallium and the rare earths are separated into two solutions and the gallium and the rare earths are then recovered therefrom.

BRIEF DESCRIPTION OF THE DRAWING

The FIGURE of Drawing is a diagrammatic illustration of a liquid/liquid extraction unit suitable for carrying out the process according to the invention.

DETAILED DESCRIPTION OF THE INVENTION

More particularly according to the present invention, the expression "mixtures of rare earth oxides and gallium oxides", or like terminology, is to be understood as meaning either mixtures of simple gallium oxides and simple rare earth oxides, or mixed oxides containing at least some gallium and at least one rare earth. The term rare earth is to be understood as meaning at least one element taken from the group comprising the lanthanides (the elements having an atomic number ranging from 57 to 71 inclusive) and yttrium (the element having an atomic number of 39).

More precisely, the mixtures of rare earth oxides and gallium oxides which can be treated in accordance with the process of the present invention contain at least a mixture of $Ga_2O_3$ and $RE_2O_3$ (RE representing an element selected from among the group comprising the rare earths) and/or one mixed oxide of the formula $(RE)_x(Ga)_yO_z$, in which x, y and z are any numbers (RE representing at least one element taken from the group comprising the rare earths), it being understood that this mixed oxide can contain elements other than Ga and RE by way of substitution and/or inclusion in the structure of the mixed oxide.

A preferred embodiment of the process according to the invention involves the treatment of mixed oxides containing at least some gallium and at least one rare earth and/or waste and/or residues from the production of the said mixed oxides.

Purely by way of illustration, the mixed oxides which can be treated in accordance with the process of the invention are, in particular:

(1) Mixed oxides having a structure of the garnet type.

Among such mixed oxides, exemplary are those having the formula:

in which RE is at least one element selected from the group comprising gadolinium, yttrium, samarium and neodymium, A is selected from the group comprising aluminium and scandium, $\alpha = \pm 0.20$, and $0 < x < 1$.

Also exemplary of the class are the mixed oxides of the formula:

in which $0 < x < 0.5$, $y \geq 0$, $0 < z \leq 1.5$, $RE_1$ is selected from the group comprising yttrium and lutetium, $RE_2$ is selected from the group comprising samarium and europium in the trivalent state, and M is calcium.

Also exemplary of this class are the mixed oxides of the formula:

in which $0 \leq x < 1$, RE is at least one element selected from the group comprising gadolinium, samarium and neodymium, M is selected from the group comprising calcium, strontium and magnesium, and A is selected from the group comprising tin and zirconium.

Also exemplary are the mixed oxides of the formula:

in which $0.2 < x < 2$, $0 < y < 1.5$, RE is at least one element selected from the group comprising yttrium, neodymium, samarium and gadolinium, $A = Ga_{1-\alpha}M_\alpha$ with $0 \leq \alpha < 1$, and M is selected from the group comprising aluminum, indium and scandium.

Also exemplary are the mixed oxides of the formula:

in which $0 < x \leq 5$.

(2) Mixed oxides having a structure of orthogallate type.

In this class, exemplary are the mixed oxides of the formula:

(RE)MO$_3$:Nd$^{3+}$ in which RE is at least one element selected from the group comprising yttrium, gadolinium, lutetium and lanthanum, and M=Al$_{1-x}$Ga$_x$ with $0<x\leq1$.

(3) Mixed oxides having a structure of spinel type.

In this class, exemplary are, the mixed oxides of the formula:

MA$_2$O$_4$:Eu$^{2+}$ in which M is an element selected from the group comprising magnesium, calcium, barium and strontium, and A=Ga$_x$Al$_{1-x}$ with $0<x\leq1$.

(4) Mixed oxides having a structure of the magnetoplombite type.

In this class, exemplary are the mixed oxides of the formulae:

MA$_{12}$O$_{19}$:Eu$^{2+}$ and (RE)MA$_{11}$O$_{19}$:Tb$^{3+}$ in which M is an element selected from the group comprising magnesium, calcium, strontium and barium, RE is at least one element selected from the group comprising cerium in the trivalent state and gadolinium, and A=Al$_{1-x}$Ga$_x$ with $0<x\leq1$.

More particularly, it is envisaged to treat gadolinium/gallium garnets and/or waste and/or residues from the production of the said garnets. These garnets correspond to the formula Gd$_3$Ga$_5$O$_{12}$.

The production residues, or waste fines, treated in accordance with the process of the present invention can originate, in particular, from the crucible residues formed during the production of mixtures of rare earth oxides and gallium oxides and/or from cutting residues and/or from polishing residues of the said mixtures.

The production waste treated in accordance with the process of the present invention generally consists of mixed oxides, the composition and/or structure of which deviate from the standards defined for these products.

In certain cases and, in particular, when treating cutting or polishing residues, it can be advantageous to remove the organic materials present in these residues by means of processes which are well known to those skilled in the art, such as treatment on active charcoal or on adsorbent polymers or treatment by extraction into an organic phase which is noncomplexing with respect to the gallium and the rare earths.

One of the advantages of the process according to the present invention is that it enables treatment of all such waste and/or these residues regardless of their origin.

The subject mixture is dissolved by means of attack by an acid medium. This acid medium consists of pure or dilute acids, by themselves or in a mixture. It is preferred to use at least one acid selected from the group comprising hydrochloric acid, nitric acid, sulfuric acid, perchloric acid and phosphoric acid. The nature of the acid is preferably selected in accordance with the subsequent separation step; hydrochloric acid or nitric acid is advantageously used.

The conditions of attack, or acidulation/dissolution, vary according to the acids used; the speed of attack depends, in particular, on the nature of the acid, its concentration and the temperature. Good conditions are generally achieved when the attack is carried out with concentrated pure acids under boil.

According to the process of the invention, it is advantageous to effectuate a certain residual acidity of the medium after attack has taken place; for this purpose, attack can be carried out under reflux, using an excess of acid, relative to stoichiometry. The production of a residual acidity of more than 2N is especially advantageous.

The size of the particles attacked is not a critical factor according to the process of the invention; however, if fairly rapid attack is desired, it is advantageous to use particles having a fairly fine size, and preferably particles having a diameter of less than about 400 microns; more particularly, the process is quite easy to carry out if particles having a diameter of between about 50 and 200 microns are used.

The concentration of dissolved oxides in the solutions obtained is adjusted, in a manner known to those skilled in the art, by the conditions under which attack is carried out. For the purpose of the subsequent separation step, it can be advantageous to obtain the highest possible concentrations and preferably concentrations of more than 100 g/liter. In the particular case where attack is carried out in a hydrochloric acid or nitric acid medium, concentrations of about 400 g/liter of dissolved oxide can be achieved, and these are especially favorable for the separation.

The step involving separation of the gallium and the rare earths into two solutions is carried out by means of liquid/liquid extration, the aqueous solution resulting from attack being brought into contact with an organic phase containing at least one-water-insoluble extraction agent, optionally dissolved in a diluent.

The extraction agent used in accordance with the process of the invention is selected from the class of the anionic extraction agents, the class of the solvating extraction agents or the class of the cationic extraction agents.

The anionic extraction agents used are, in particular, long-chain organic compounds containing primary, secondary or tertiary amine groups, or quaternary ammonium, sulfonium or phosphonium salts.

Preferably, the hydrocarbon chains of these compounds generally have between about 5 and 30 carbon atoms.

Examples of such extractants are:

The products marketed under the trademark Primene JM and consisting of primary amines of the formula:

in which R is a hydrocarbon radical having from 18 to 24 carbon atoms;

The products marketed under the trademark Amberlite LA-1 and consisting of secondary amines of the formula:

in which the hydrocarbon radicals R$_1$, R$_2$ and R$_3$ are such that the sum of the carbon atoms therein is between 12 and 14;

The products marketed under the trademarks Alamine 336 and Adogen 364 and consisting of tertiary amines of the formula R₃N, in which the hydrocarbon radical R has from 8 to 10 carbon atoms;

The products marketed under the trademarks Adogen 464 and Aliquat 336 and consisting of quaternary ammonium salts of the formula:

$$[R_3N\text{---}CH_3]^+ X^-$$

in which the hydrocarbon radical R has from 8 to 10 carbon atoms and X represents an anion, preferably chloride, nitrate or sulfate; and The sulfonium salts of the general formula:

$$\left[ R\text{---}S\underset{CH_3}{\overset{CH_3}{\diagup}} \right]^+ X^-$$

in which the hydrocarbon radical R has from 10 to 18 carbon atoms and X represents an anion, preferably chloride or nitrate.

The amines and the quaternary ammonium salts described in U.S. Pat. Nos. 3,294,494 2,877,250 too are exemplary.

Depending upon the nature of the anion present in the aqueous attacking solution, either the gallium or the rare earths are preferentially extracted into the organic phase by the anionic extraction agent. Thus, in a chloride medium, the gallium is preferentially extracted, whereas, in a nitrate or sulfate medium, it is the rare earths which are preferentially extracted into the organic phase.

Furthermore, in a chloride medium, all of the aforesaid anionic agents can be used. In a nitrate medium, the tertiary amines or the quaternary ammonium salts are preferably used, and, in a sulfate medium, the primary amines are preferably used.

In order to favor or aid the extraction, it can be advantageous, in a chloride medium, to add hydrochloric acid to the aqueous phase. It is necessary for the molar concentration of acid in the aqueous phase to be at least equal to the molar concentration of the gallium.

Depending upon the nature of the anion present in the aqueous phase, it can also be advantageous to add, to the latter, non-extractable neutral salts, namely, respectively, chlorides, nitrates or sulfates of alkali metals, alkaline earth metals or aluminum.

The solvating extraction agents used are, in particular, esters, ethers, sulfoxides, ketones and alcohols, neutral organophosphorus compounds and trialkylamine oxides.

Solvating extraction agents which are exemplary are:

The esters of the general formula:

$$R_1\diagdown_{R_2O}\!\!\diagup C=O$$

in which R₁ and R₂ are aromatic and/or aliphatic hydrocarbon radicals preferably having at least 4 carbon atoms, for example, ethyl acetate and butyl acetate;

The ethers of the general formula R₁—O—R₂, in which R₁ and R₂ are aromatic and/or aliphatic hydrocarbon radicals preferably having at least 4 carbon atoms, for example, diethyl ether and isopropyl and di-n-butyl ethers;

The sulfoxides of the general formula:

$$R_1\diagdown_{R_2}\!\!\diagup SO$$

in which R₁ and R₂ are aromatic and/or aliphatic hydrocarbon radicals preferably having at least 4 carbon atoms, for example di-n-pentylsulfoxide, di-n-octylsulfoxide and diphenylsulfoxide;

The ketones of the general formula:

$$R_1\diagdown_{R_2}\!\!\diagup C=O$$

in which R₁ and R₂ are aromatic and/or aliphatic hydrocarbon radicals preferably having at least 4 carbon atoms, for example, diisopropyl ketone, methyl isobutyl ketone and mesityl oxide;

The alcohols of the general formula ROH, in which R is an aliphatic and/or cycloaliphatic hydrocarbon radical preferably having at least 4 carbon atoms, for example cyclohexanol, n-hexan-1-ol, 2-ethylhexanol, n-heptanol and n-octanol;

The neutral organophosphorus compounds of the general formulae:

$$R_2O\text{---}\overset{OR_1}{\underset{OR_3}{P}}=O \quad \text{or} \quad R_2O\text{---}\overset{OR_1}{\underset{R_3}{P}}=O \quad \text{or} \quad R_2O\text{---}\overset{R_1}{\underset{R_3}{P}}=O \quad \text{or} \quad R_2\text{---}\overset{R_1}{\underset{R_3}{P}}=O$$

in which R₁, R₂ and R₃ represent aromatic and/or aliphatic hydrocarbon radicals preferably having at least 4 carbon atoms, for example, the stearyl and cetyl esters of phosphoric acid, tributyl phosphate, dibutyl butylphosphonate, 2-ethylhexyl bis-(2-ethylhexyl) phosphonate, butyl bis-(chloromethyl) phosphonate and tri-n-octylphosphine oxide. Among such compounds, it is preferred to use tributyl phosphate; and The trialkylamine oxides of the general formula R₃N=O, in which R is an aliphatic hydrocarbon radical preferably having at least 4 carbon atoms, for example, trioctylamine oxide.

Depending upon the nature of the anion present in the aqueous attacking solution, either the gallium or the rare earths are preferentially extracted into the organic phase by the solvating extraction agent. Thus, in a chloride medium, the gallium is preferentially extracted, whereas, in a nitrate medium, it is the rare earths which are preferentially extracted into the organic phase.

Furthermore, in a chloride medium, any solvating agent can be used. In a nitrate medium, the organophosphorus derivatives and the sulfoxides are preferably used.

When the solvating extraction agents are used in a chloride medium, it is advisable for the molar concentration of acid in the aqueous phase to be at least equal to the molar concentration of the gallium in the aqueous attacking solution; for this purpose, it can also be advantageous to add hydrochloric acid to the attacking solution in order to carry out the separation of the gallium solution and the rare earth solution under good conditions.

In order to favor extraction, it can be advantageous to add, to the aqueous phase, non-extractable neutral salts such as, for example, the chlorides or nitrates of alkali metals, alkaline earth metals or aluminum.

The cationic extraction agents used are, in particular, organophosphorus acids, aliphatic or aromatic acids, halogen-containing aliphatic, aromatic or cycloaliphatic acids, naphthenic acids, heavy acid fractions, sulfonic acids, "Versatic" acids and β-diketones.

Cationic extraction agents which are exemplary include:

The organophosphorus acids of the general formulae:

in which $R_1$ and $R_2$ represent aliphatic or aromatic hydrocarbon radicals which are such that the total number of carbon atoms in these groups is equal to at least 10. Bis-(2-ethylhexyl)phosphoric acid and bis-(2-ethylhexyl)-phosphonic acid are preferably used;

Aliphatic acids in which the hydrocarbon radicals have from 3 to 20 carbon atoms, in particular butanoic, valeric, octoic, caproic, caprylic, capric, pelargonic and lauric acids;

Halogen-containing aliphatic, aromatic or cycloaliphatic acids, such as, for example, alpha-bromolauric acid;

The naphthenic acids having the general formula:

in which n is >1;

Heavy acid fractions containing, in particular, mixtures of $C_5$–$C_6$, $C_7$–$C_9$, $C_9$–$C_{11}$, $C_{10}$–$C_{16}$, $C_{10}$–$C_{13}$ and $C_{12}$–$C_{16}$ acids;

Sulfonic acids, such as di-nonylnaphthalene-sulfonic acid;

The "Versatic" acids (registered trademark of the Société Shell Chemicals) having the general formula:

in which $R_1$ and $R_2$ are substituted or unsubstituted hydrocarbon radicals, in particular "Versatic 911" acid (registered trademark of Shell Chemicals) which is a mixture of saturated tertiary monocarboxylic acids in which $R_1$ and $R_2$ are hydrocarbon radicals in which the sum of the carbon atoms in the two radicals is equal to 6, 7 or 8, and which is manufactured by the oxo synthesis from $C_9$–$C_{11}$ olefins; "Versatic 15/19" acid (registered trademark of Shell Chemicals) in which $R_1$ is a hexyl radical and $R_2$ is an octyl radical; and "Versatic 10" acid (registered trademark of Shell Chemicals) which is derived by the Shell process for the carboxylation of $C_9$ olefins and in which $R_1$ and $R_2$ are hydrocarbon radicals in which the sum of the carbon atoms in the two radicals is equal to 7; and β-Diketones, such as acetylacetone.

Since the selectivities observed when using cationic extraction agents are generally lower than in the case of anionic and solvating agents, it may be preferred, according to the invention, to use these latter two classes of extraction agents in order to achieve efficient separations under the most advantageous economic conditions.

The proportion of extraction agent in the organic phase is not critical and can vary over wide limits. However, it is generally advantageous if the proportion is as high as possible. Thus, in the case of anionic and cationic extraction agents, a proportion of between 10 and 40% by volume, relative to the organic phase, leads to advantageous hydrodynamic conditions of separation. In the case of solvating extraction agents, some of them (the least viscous) can be used pure, i.e., undiluted, and this is extremely advantageous because it affords very large extraction capacities.

The diluents used in accordance with the process of the invention are those diluents which are normally used for liquid/liquid extraction. They can be used either by themselves or in a mixture. The diluents which are exemplary include aliphatic compounds, such as, for example, heptane, dodecane, hexane and petroleum cuts of the kerosene type, aromatic compounds, such as, for example, benzene, toluene, ethylbenzene, xylene and cuts of the Solvesso type (registered trademark of the Societe Exxon), and finally halogen derivatives of these compounds, such as, for example, chloroform and carbon tetrachloride.

As is well known in the field of liquid/liquid extraction, the organic phase can also contain modifiers. Exemplary modifiers include substances with an alcohol group, in particular heavy alcohols in which the number of carbon atoms is between 6 and 15, such as n-decanol and isodecanol, and heavy phenols, such as nonylphenol.

The step involving separation of the gallium and the rare earths into two solutions leads to the production of an aqueous solution which contains the element or elements which have not been extracted from the attacking solution, and of an organic solution which contains the element or elements which have been extracted. As hereinabove described, either the gallium or the rare earths are extracted into the organic solution, depending upon the nature of the anion present in the attacking solution.

The step involving recovery, in aqueous solution, of the gallium or the rare earths which have been extracted into the organic solution is carried out:

In the case where anionic or solvating agents have been used for the separation, by bringing this organic solution into contact with water or a weakly acid aqueous solution in which the concentration of H+ ions is preferably less than or equal to 0.1N, the extracted element or elements transferring from the organic phase into the aqueous phase; or In the case where a cationic agent has been used for the separation, by bringing this organic solution into contact with an aqueous solution of a strong acid. The strong acid used can be identical to or different from that used for attack, the extracted element or elements transferring from the organic phase into the acid aqueous solution. The concentration of acid used is adjusted according to the nature of the extraction agent and to the desired concentration of the element recovered in the aqueous phase.

by weight of garnet solubilized and the residual acidity of the resulting solution A, B, C, D, E, F, G or H.

TABLE I

| Solution | Acid | | Concentration in % by weight | Time of attack y in hours | % Solubilized (greater than) | Residual acidity (normality) |
|---|---|---|---|---|---|---|
| A | HNO$_3$ | | 64 | 6 | >99 | 13 |
| B | HCl | | 36 | 3 | >99 | 11 |
| C | HNO$_3$/HCl mixture | HCl HNO$_3$ | 24 21 | 5 | >99 >99 | 11.7 |
| D | H$_3$PO$_4$ | | 85 | 3 | >99 | 14 |
| E | H$_2$SO$_4$ | | 95 | 4 | >99 | 17 |
| F | HCl/H$_2$SO$_4$ mixture | HCl H$_2$SO$_4$ | 18 47.5 | 3 | >99 | 14 |
| G | HNO$_3$/H$_2$SO$_4$ mixture | H$_2$SO$_4$ HNO$_3$ | 47.5 32 | 3 | >99 | 15 |
| H | H$_3$PO$_4$/H$_2$SO$_4$ mixture | H$_3$PO$_4$ H$_2$SO$_4$ | 42.5 47.5 | 4 | >99 | 15.5 |

Starting from the neutral or aqueous acid solutions obtained in this way, the gallium and the rare earths can be recovered after an optional complementary purification by the usual methods.

As is well known, this complementary purification can in particular consist, in the case of the rare earth or rare earths, of the precipitation of the hydroxides, oxalates or carbonates and, in the case of the gallium, of the precipitation of gallium trioxide or of electrolysis in order to obtain gallium metal.

Furthermore, the process of the present invention makes it possible, in certain cases, to obtain a gallium solution, the purity of which is such that it can be used to prepare a gallium oxide of sufficient purity for direct reuse in the manufacture of the mixed oxides.

The separation and recovery steps can be carried out in the conventional devices employed for liquid/liquid extraction processes. Such devices generally comprise several stages of mixer-settler systems, or of packed and/or stirred columns, which are arranged for carrying out the operations of extraction, selective washing and recovery of the extracted elements in aqueous phase.

In order to further illustrate the present invention and the advantages thereof, the following specific examples are given, it being understood that same are intended only as illustrative and in nowise limitative.

EXAMPLE 1

The following example illustrates the acid attack, or acidulation/dissolution, of residues or waste fines emanating from the production of gallium/gadolinium garnets, Gd$_3$Ga$_5$O$_{12}$ corresponding to the composition of gallium and gadolinium, expressed as oxides, of 54% by weight of Gd$_2$O$_3$ and 46% by weight of Ga$_2$O$_3$.

These residues were ground in order to obtain a powder having a mean particle diameter of about 200 microns (90% of the particles having a diameter of between 100 and 300 microns).

One gram of powder was contacted, at a boil and under reflux, with 25 ml of acid of various concentrations, for y hours, under stirring. The Table below summarizes the results obtained regarding the percentage

EXAMPLE 2

330 grams of a powder as obtained in accordance with Example 1 were contacted, under reflux, with 1 liter of boiling 10N nitric acid for 20 hours; the efficiency of attack was greater than 99% and the residual acidity was 2N.

The resulting solution contained gallium and gadolinium in the following concentrations:

Ga$_2$O$_3$: 150 g/liter, which corresponds to Ga: 112 g/liter.

Gd$_2$O$_3$: 176 g/liter, which corresponds to Gd: 153 g/liter.

Figure 1:
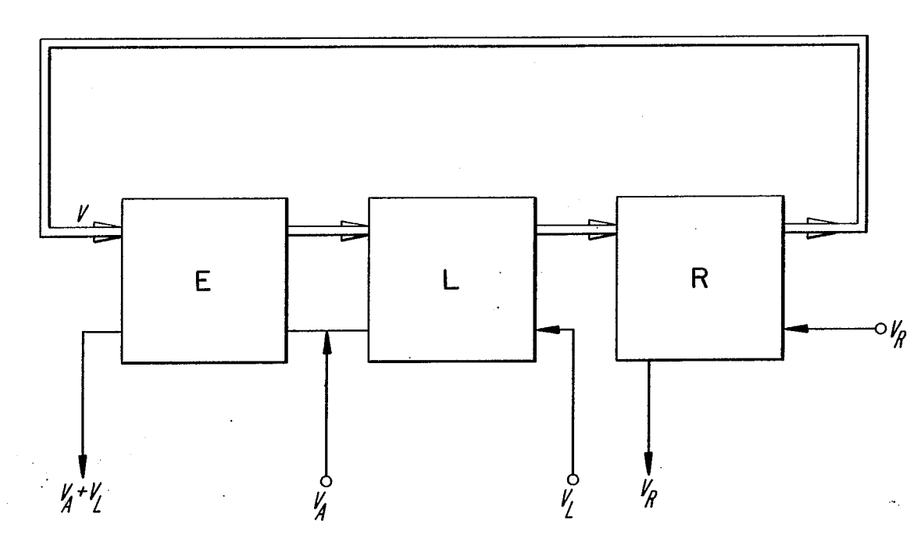

The separation and the recovery of the gallium and the gadolinium from this solution were carried out in a multistage liquid/liquid extractor, with the organic and aqueous phases circulating in countercurrent. This extraction device is represented diagrammatically in the Figure of Drawing. It comprised an extraction section E, composed of seven (7) stages, a selective washing section L, composed of six (6) stages, and a regeneration section R, composed of four (4) stages. The organic phase containing the extraction agent was circulated successively through the sections E, L and R at a flow rate V. The feed solution (flow rate $v_A$) resulting from the acidulation/dissolution was injected into the extraction zone. The 4M ammonium nitrate solution (flow rate $v_L$) which performed the selective washing was introduced into the section L. The aqueous solution containing the purified gallium was recovered at the outlet of the extraction zone (flow rate $v_A + v_L$). A weakly acid aqueous solution, namely, 0.1N HNO$_3$, was introduced into the section R (flow rate $v_R$). This aqueous phase was recovered at the outlet of the section R. It then contained the purified gadolinium.

The Table below summarizes, with reference to the Figure of Drawing, the flow rates employed and the results obtained in the case of:

(1) the use of an anionic extraction agent, namely, Aliquat 336 (in nitrate form) diluted to 0.5 mol/liter in Solvesso 150; and (2) the use of a solvating extraction agent, namely, tributyl phosphate (TBP) diluted to 50% strength by volume in kerosene.

TABLE II

| | FLOW RATES | | | RESULTS | |
|---|---|---|---|---|---|
| | V | $V_A$ | $V_L$ | $V_R$ | Solution of purified gallium | Solution of purified gadonlinium |
| Aliquat | 5.85 | 1 | 0.18 | 1 | Flow rate $v_A + v_L = 1.18$<br>$Ga_2O_3$: 127 g/liter<br>$Gd_2O_3 < 1$ mg/liter<br>Ga: 94.4 g/liter | Flow rate $v_R = 1$<br>$Gd_2O_3$: 176 g/liter<br>$Ga_2O_3 < 1$ mg/liter<br>Gd: 153 g/liter |
| TBP | 2.86 | 1 | 0.14 | 1.3 | Flow rate = 1.14<br>$Ga_2O_3$: 131.6 g/liter<br>$Gd_2O_3 < 1$ mg/liter<br>Ga: 97.8 g/liter | Flow rate = 1.3<br>$Gd_2O_3$: 134.6 g/liter<br>$Ga_2O_3 < 1$ mg/liter<br>Gd: 116.6 g/liter |

It has been determined that the process according to the invention enables obtainment of purified solutions containing less than 10 ppm of each element Ga or Gd in the other element.

EXAMPLE 3

330 g of a powder as obtained in accordance with Example 1 were contacted, under reflux, with 1 liter of boiling 10N hydrochloric acid for 4 hours. The degree of attack was greater than 99%.

The resulting solution had the following composition:

$Ga_2O_3$: 150 g/liter, which corresponds to Ga: 112 g/liter $Gd_2O_3$: 176 g/liter, which corresponds to Gd: 153 g/liter.

The separation and the recovery of the gallium and the gadolinium from this solution were carried out in the same multi-stage extractor as that described in Example 2.

The 0.1N hydrochloric acid solution (flow rate $v_L$) which performed the selective washing was introduced into the section L. The aqueous solution containing the purified gadolinium was recovered at the outlet of the extraction section (flow rate $v_A + v_L$). A weakly acid aqueous solution, namely, 0.1N HCl, was introduced into the section R (flow rate $v_R$). This aqueous phase was recovered at the outlet of the section R. It then contained the purified gallium.

The Table below summarizes, with reference to the Figure of Drawing, the flow rates employed and the results obtained in the case of:

(1) the use of an anionic extraction agent, namely, Aliquat 336 (in chloride form) diluted to 0.5 mol/liter in Solvesso 150; and (2) the use of a solvating extraction agent, namely tributyl phosphate (TBP) diluted to 50% strength by volume in kerosene.

TABLE III

| | FLOW RATES | | | | RESULTS | |
|---|---|---|---|---|---|---|
| | V | $V_A$ | $V_L$ | $V_R$ | Solution of purified gallium | Solution of purified gadolinium |
| Aliquat | 5 | 1 | 0.25 | 10 | Flow rate $v_R = 10$<br>$Ga_2O_3$: 15 g/liter<br>$Gd_2O_3$: < 1 mg/liter<br>Ga: 11.2 g/liter | Flow rate $v_A + v_L = 1.25$<br>$Gd_2O_3$: 140.8 g/liter<br>$Ga_2O_3 < 1$ mg/liter<br>Gd: 122.4 g/liter |
| TBP | 2.2 | 1 | 0.1 | 2.2 | Flow rate = 2.2<br>$Ga_2O_3$: 68.2 g/liter<br>$Gd_2O_3 < 1$ mg/liter<br>Ga: 50.9 g/liter | Flow rate = 1.1<br>$Gd_2O_3$: 160 g/liter<br>$Ga_2O_3 < 1$ mg/liter<br>Gd: 139 g/liter |

As in the preceding example, the process according to the invention enables obtainment of purified solutions in only two steps (attack and separation by liquid/liquid extraction), under very advantageous economic conditions. It was noted that the gallium was present in the gadolinium in an amount of less than 10 ppm; in the case of the gadolinium present in the gallium, the purity indicated was at the analytical limits of the method of determination employed; although the solutions of purified gallium obtained are concentrated, less than 10 ppm of gadolinium in the gallium were in fact analyzed.

EXAMPLE 4

This example illustrates the treatment of residues of the manufacture of various crystals used in the electronics field (magnetic bubbles, semiconductors, laser crystals).

The residues were ground in a manner to obtain a powder the average particle diameter of which was approximately 200 microns.

300 g of the powder was placed in contact at boiling and with reflux with 1 liter of hydrochloric or nitric acid of different concentrations for y hours under agitation. The table below compiles the results obtained with respect to the % by wieght of solubilized crystals and the residual activity of the solution (Table IV).

TABLE IV

| Compounds | Acid | Solution | Normal Concentration | Treatment Time, H | % Solubility | Residual Acidity | [Ga] g/l | [Tr] g/l |
|---|---|---|---|---|---|---|---|---|
| $Y_3Ga_5O_{12}$ | HCl | A | 10 N | 14 | 99 | 2.2 N | 129 | 100 |
| | $HNO_3$ | B | 10 N | 15 | 99 | 2.2 N | 129 | 100 |
| $Sm_3Ga_5O_{12}$ | HCl | C | 10 N | 14 | 99 | 2.2 N | 105 | 150 |
| | $HNO_3$ | D | 10 N | 15 | 99 | 2.1 N | 105 | 150 |
| $Gd_2CaGa_5O_{12}$ | HCl | E | 10 N | 4 | 99 | 2.2 N | 118.5 | 102 |
| | $HNO_3$ | F | 10 N | 12 | 99 | 2.2 N | 118.5 | 102 |
| $Y_3Al_3Ga_2O_{12}$ | HCl | G | 10 N | 4 | 99 | 2.2 N | 60 | 100 |
| | $HNO_3$ | H | 10 N | 20 | 99 | 2.1 N | 60 | 100 |

TABLE IV-continued

| Compounds | Acid | Solution | Normal Concentration | Treatment Time, H | % Solubility | Residual Acidity | [Ga] g/l | [Tr] g/l |
|---|---|---|---|---|---|---|---|---|
| LaGaO$_3$ | HCl | I | 10 N | 4 | 99 | 2.2 N | 81 | 162 |
| (dope Nd3+) | HNO$_3$ | J | 10 N | 12 | 99 | 2.2 N | 81 | 162 |
| Y$_2$GaFe$_5$O$_{12}$ | HCl | K | 10 N | 4 | 99 | 2.2 N | 29 | 74 |
| | HNO$_3$ | L | 10 N | 15 | 99 | 2.2 N | 29.1 | 74 |

EXAMPLE 5

This example illustrates the separation and the recovery of gallium and rare earths when the dissolution is effected by nitric acid (solutions B, D, J of Example 4).

Separation took place in a multistage apparatus, with the aqueous and organic phases circulating countercurrently. The apparatus employed is shown schematically in the Figure of the Drawing. It comprised an extraction section E comprising 7 stages, a wash section L with 6 stages and a regeneration section with 4 stages.

The solvent used was tributylphosphate (TBP) diluted 50% by volume in kerosene.

The results of the separation are tabulated below in Table V, together with the flow rates employed.

TABLE V

| Solutions | Flow Rates | | | | Results | |
|---|---|---|---|---|---|---|
| | V | V$_A$ | V$_L$ | V$_R$ | Purified Ga$^{3+}$ Solutions | Purified Tr$^{3+}$ Solutions |
| B | 3 | 1 | 0.1 | 1.3 | Ga: 117.2 g/l<br>Y ≦ 1 mg/l<br>Flow Rates: 1.1 | Ga ≦ 1 mg/l<br>Y: 76.9 g/l<br>Flow Rates: 1.3 |
| D | 2.8 | 1 | 0.13 | 1.2 | Ga: 92.8 g/l<br>Sm ≦ 1 mg/l<br>Flow Rates: 1.13 | Sm: 125 g/l<br>Ga ≦ 1 mg/l<br>Flow Rates: 1.2 |
| J | 2.10 | 1 | 0.20 | 1.3 | Ga: 67.5 g/l<br>La ≦ 1 mg/l<br>Flow Rates: 1.20 | La: 115.3 g/l<br>Ga ≦ 1 mg/l<br>Flow Rates: 1.3 |

EXAMPLE 6

This example illustrates the separation and recovery of gallium and rare earths when the dissolution is effected with hydrochloric acid (solutions A, C, E, G, I, K of Example 4).

The separation and recovery of gallium and rare earths from these solutions was effected in the multistage apparatus described in Example 5.

The 0.1N hydrochloric acid solution used for washing was introduced in Section E. The rare earth solution was recovered at the outlet of the extraction.

Extraction was effected by a weakly acidic 0.1N HCl solution recovered at the outlet of Section R.

Teh following table compiles the different results obtained, together with the flow rates employed.

The solvent used was TBP diluted 50% by volume in kerosene.

TABLE VI

| Solutions | Flow Rates | | | | Results | |
|---|---|---|---|---|---|---|
| | V | V$_A$ | V$_L$ | V$_R$ | Gallium Solution | Tr$^{3+}$ Solution |
| A | 2.2 | 1 | 0.1 | 2.2 | Flow Rate: 2.2<br>Ga: 58.6 g/l<br>Y ≦ 1 mg/l | Flow Rate: 1.1<br>Ga ≦ 1 mg/l<br>Y: 80.9 g/l |
| C | 2.2 | 1 | 0.1 | 2.2 | Flow Rate: 2.2<br>Ga: 47.72<br>Sm ≦ 1 mg/l | Flow Rate: 1.1<br>Ga ≦ 1 mg/l<br>Sm: 136.3 g/l |
| E | 2.2 | 1 | 0.1 | 2.2 | Flow Rate: 2.2<br>Ga: 53.8 g/l<br>Gd ≦ 1 mg/l | Flow Rate: 1.1<br>Ga ≦ mg/l<br>Gd: 92.7 g/l |
| G | 2.0 | 1 | 0.1 | 2 | Flow Rate: 2<br>Ga: 30 g/l<br>Y ≦ 1 mg/l | Flow Rate: 1.1<br>Ga ≦ 1 mg/l<br>Y: 90 g/l |
| I | 2.0 | 1 | 0.1 | 2 | Flow Rate: 2<br>Ga: 40.5 g/l<br>La ≦ 1 mg/l | Flow Rate: 1.1<br>Ga ≦ 1 mg/l<br>La ≦ 147.2 g/l |
| K | 2.0 | 1 | 0.4 | 2.0 | Flow Rate: 2.2<br>Ga: 14.5 g/l<br>Y ≦ 1 mg/l | Flow Rate: 1.4<br>Ga ≦ 1 mg/l<br>Y: 52.85 g/l |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the recovery of gallium and rare earth values from mixtures of the oxides thereof, comprising:
   (i) acidulating and dissolving such admixtures in a chloride acidic medium;
   (ii) liquid/liquid extracting the solution which results with a water-insoluble organic extraction agent into an aqueous phase and an organic phase, whereby said gallium values are preferentially transferred from said aqueous phase into said organic phase; and
   (iii) recovering said gallium and said rare earth values from the respective phases comprising same.

2. The process as defined by claim 1, said acidic medium comprising at least one acid selected from the group consisting of hydrochloric acid and perchloric acid.

3. The process as defined by claim 2, said acidic medium being at a boil.

4. The process as defined by claim 3, said acidic medium being both pure and concentrated.

5. The process as defined by claim 2, said acidulating and dissolving being conducted under reflux in such stoichiometric excess of acid that the residual acidity of the acidic medium, upon completion of the acidulation dissolution, is greater than 2N.

6. The process as defined by claim 1 the starting material oxide admixture being particulate, and the particles thereof having diameter sizes of less than 400 microns.

7. The process as defined by claim 6, said diameter sizes ranging from 50 to 200 microns.

8. The process as defined by claim 1, said extractant being an anionic extractant selected from the group consisting of long-chain hydrocarbons comprising primary, secondary or tertiary amino functions, or quaternary ammonium, sulfonium or phosphonium salt functions.

9. The process as defined by claim 8, said anionic extractant being selected from the group consisting of:
   (i) primary amines of the formula:

in which R is a hydrocarbon having from 18 to 24 carbon atoms;

(ii) secondary amines of the formula:

in which $R_1$, $R_2$ and $R_3$ are hydrocarbons, the sum of the total carbon atoms of which is from 12 to 14;

(iii) tertiary amines of the formula $R_3N$, in which R is a hydrocarbon having from 8 to 10 carbon atoms;

(iv) quaternary ammonium salts of the formula:

in which R is a hydrocarbon having from 8 to 10 carbon atoms and X is a chloride, nitrate or sulfate anion; and (v) sulfonium salts of the general formula:

in which R is a hydrocarbon having from 10 to 18 carbon atoms and X is a chloride or nitrate anion.

10. The process as defined by claim 1, said extractant being a solvating extractant selected from the group consisting of esters, ethers, sulfoxides, ketones, alcohols, neutral organophosphorus compounds and trialkylamine oxides.

11. The process as defined by claim 10, said solvating extractant being selected from the group consisting of:

(i) esters of the general formula:

in which $R_1$ and $R_2$ are hydrocarbon radicals having at least 4 carbon atoms;

(ii) ethers of the general formula $R_1$-O-$R_2$, in which $R_1$ and $R_2$ are hydrocarbon radicals having at least 4 carbon atoms;

(iii) sulfoxides of the general formula:

in which $R_1$ and $R_2$ are hydrocarbon radicals having at least 4 carbon atoms;

(iv) ketones of the general formula:

in which $R_1$ and $R_2$ are hydrocarbon radicals having at least 4 carbon atoms;

(v) alcohols of the general formula ROH, in which R is a hydrocarbon radical having at least 4 carbon atoms;

(vi) neutral organophosphorus compounds of the general formulae:

in which $R_1$ and $R_2$ and $R_3$ represent hydrocarbon radicals having at least 4 carbon atoms; and (vii) trialkylamine oxides of the general formula $R_3NO$, in which R is an aliphatic hydrocarbon radical having at least 4 carbon atoms.

12. The process as defined by claim 11 said solvating extractant being selected from the group consisting of ethyl acetate, butyl acetate, diethyl ether, isopropyl ether, di-n-butyl ether, di-n-pentylsulfoxide, di-n-octylsulfoxide, diphenylsulfoxide, diisopropyl ketone, methyl isobutyl ketone, mesityl oxide, cyclohexanol, n-hexan-1-ol, 2-ethylhexanol, n-heptanol, n-octanol, the stearyl and cetyl esters of phosphoric acid, tributyl phosphate, dibutyl butylphosphonate, 2-ethylhexyl bis-(2-ethylhexyl) phosphonate, butyl bis-(chloromethyl)-phosphonate, tri-n-octylphosphine oxide, and trioctylamine oxide.

13. The process as defined by claim 1, the solution resulting upon acidulation/dissolution further comprising a nonextractable neutral salt, the anion of which corresponding to that of the acidic medium the cation thereof being selected from the group consisting of alkali and alkaline earth metal, and aluminum.

14. The process as defined by claim 1, said extractant being anionic or solvating and the acidic medium comprising chloride anion, further including the addition of hydrochloric acid to the solution resulting upon acidulation/dissolution.

15. The process as defined by claim 1, said organic phase further comprising a heavy alcoholic or heavy phenolic modifier.

16. The process as defined by claim 1, said organic extractant further comprising a diluent therefor.

17. The process as defined by claim 1, said extractant being an anionic or solvating extractant, and wherein the recovery (iii) from the organic phase comprises the liquid/liquid extraction thereof with an aqueous or weakly acidic aqueous solution, with either said gallium values or said rare earth values being transferred from said organic phase into the resulting second aqueous phase.

18. The process as defined by claim 17, said liquid llquid extraction being with a weakly acidic aqueous solution, the concentration of $H^+$ ions therein being 0.1N or less.

19. The process as defined by claim 1, the starting material oxide mixture comprising waste fines from the production of garnets.

20. The process as defined by claim 1, the starting material oxide mixture comprising mixed oxides of the formula:

$$RE_{3+a}(Ga_{5-x}A_x)_{1-\frac{a}{5}}O_{12}$$

in which RE is at least one element selected from the group consisting of gadolinium, yttrium, samarium and neodymium, A is selected from the group consisting of aluminium and scandium, $\alpha = \pm 0.20$, and $0 \leq <1$.

21. The process as defined by claim 1, the starting material oxide mixture comprising mixed oxides of the formula:

$$(RE_1)_{3-x-y}(RE_2)_xM_xFe_{5-z}Ga_zGe_zO_{12}$$

in which $0<x<0.5$, $y \geq 0$, $0<z \leq 1.5$, $RE_1$ is selected from the group consisting of samarium and europium in the trivalent state, and M is calcium.

22. The process as defined by claim 1, the starting material oxide mixture comprising mixed oxides of the formula:

$$RE_{3-x}M_xGa_{5-x}A_xO_{12}$$

in which $0 \leq x<1$, RE is at least one element selected from the group consisting of gadolinium, samarium and neodymium, M is selected from the group consisting of calcium, strontium and magnesium, and A is selected from the group consisting of tin and zirconium.

23. The process as defined by claim 1, the starting material oxide mixture comprising mixed oxide of the formula:

$$(RE)_{3-x}Bi_xFe_{5-y}A_yO_{12}$$

in which $0.2<x<2$, $0<y<1.5$, RE is at least one element selected from the group consisting of yttrium, neodymium, samarium and gadolinium, $A=Ga_{1-\alpha}M_\alpha$ with $0 \leq \alpha <1$, and M is selected from the group consisting of aluminum, indium and scandium.

24. The process as defined by claim 1, the starting material oxide mixture comprising mixed oxides of the formula:

$$Y_5Al_{5-x}Ga_xO_{12}:Ce^{3+}$$

in which $0<x \leq 5$.

25. The process as defined by claim 1, the starting material oxide mixture comprising mixed oxides of the formula:

$$(RE)MO_3:Nd^{3+}$$

in which RE is at least one element selected from the group consisting of yttrium, gadolinium, lutetium and lanthanum, and $M=Al_{1-x}Ga_x$ with $0<x \leq 1$.

26. The process as defined by claim 1, the starting material oxide mixture comprising mixed oxides of the formula:

$$MA_2O_4:Eu^{2+}$$

in which M is an element selected from the group consisting of magnesium, calcium, barium and strontium, and $A=Ga_xAl_{1-x}$ with $0<x \leq 1$.

27. The process as defined by claim 1, the starting material oxide mixture comprising mixed oxides of the formula:

$$MA_{12}O_{19}:Eu^{2+} \text{ or } (RE)MA_{11}O_{19}:Tb^{3+}$$

in which M is an element selected from the group consisting of magnesium, calcium, strontium and barium, RE is at least one element selected from the group consisting of cerium in the trivalent state and gadolinium, and $A=Al_{1-x}GA_x$ with $0<x \leq 1$.

28. The process of claim 1, wherein the starting material oxide mixture comprises waste fines from the production of gadolinium/gallium garnets.

29. The process of claim 1, wherein the rare earth values comprise gadolinium.

30. A process for the recovery of gallium and gadolinium values from a mixture comprising the oxides thereof, with the process comprising (i) acidulating and dissolving the mixture in an acidic medium by contacting the mixture with sufficient nitric acid such that the residual acidity is at least 2N, (ii) next liquid/liquid extracting the resulting solution with a quaternary ammonium organic anionic extractant into an aqueous phase and an organic phase, with the gadolinium values being extracted into the organic phase, and (iii) thence recovering said gallium and said gadolinium rare earth values from their respective phases, whereby the gadolinium values are recovered from the organic phase by contacting the organic phase with water or a weakly acid aqueous solution in which the concentration of H+ ions is less than or equal to 0.1N.

31. The process of claim 30, wherein the acidulating and dissolving are conducted under reflux.

32. The process of claim 30, wherein the anionic extractant is in nitrate form.

33. A process for the recovery of gallium and gadolinium values from a mixture comprising the oxides thereof, with the process comprising (i) acidulating and dissolving the mixture in an acidic medium by contacting the mixture with sufficient nitric acid such that the residual acidity is at least 2N, (ii) next liquid/liquid extracting the resulting solution with tributyl phosphate as an organic extractant into an aqueous phase and an organic phase, with the gadolinium values being extracted into the organic phase, and (iii) thence recovering said gallium and said gadolinium rare earth values from their respective phases, whereby the gadolinium values are recovered from the organic phase by contacting the organic phase with water or a weakly acid aqueous solution in which the concentration of H+ ions is less than or equal to 0.1N.

34. The process of claim 33, wherein the acidulating and dissolving are conducted under reflux.

35. A process for the recovery of gallium and gadolinium values from a mixture comprising the oxides thereof, with the process comprising (i) acidulating and dissolving the mixture in an acidic medium by contacting the mixture with sufficient hydrochloric acid such that the residual acidity is at least 2N, (ii) next liquid/-liquid extracting the resulting solution with a quaternary ammonium organic extractant into an aqueous phase and an organic phase, with the gallium values being extracted into the organic phase, and (iii) thence recovering said gallium and said gadolinium rare earth values from their respective phases, whereby the gallium values are received from the organic phase by contacting the organic phase with water or a weakly acid aqueous solution in which the concentration of H+ ions is less than or equal to 0.1N.

36. The process of claim 35, wherein the acidulating and dissolving are conducted under reflux.

37. The process of claim 35, wherein the organic extractant is in chloride form.

38. A process for the recovery of gallium and gadolinium values from a mixture comprising the oxides thereof, with the process comprising (i) acidulating and dissolving the mixture in an acidic medium by contacting the mixture with sufficient hydrochloric acid such that the residual acidity is at least 2N, (ii) next liquid/liquid extracting the resulting solution with tributyl phosphate as the organic extractant into an aqueous phase and an organic phase, with the gallium values thereby being extracted into the organic phase, and (iii) thence recovering said gallium and said gadolinium rare earth values from their respective phases, whereby the gallium values are recovered from the organic phase by contacting the organic phase with water or a weakly acid aqueous solution in which the concentration of H+ ions is less than or equal to 0.1N.

39. The process of claim 38, wherein the acidulating and dissolving are conducted under reflux.

40. The process of claim 5, wherein the the extraction agent is an anionic extractant selected from the group consisting of long-chain hydrocarbons comprising primary, secondary or tertiary amine functions, or quaternary ammonium, sulfonium or phosphonium salt functions.

41. The process of claim 40, wherein the starting oxide mixture comprises the oxides of gallium and gadolinium.

42. The process of claim 5, wherein the extraction agent is a solvating extractant selected from the group consisting of esters, ethers, sulfoxides, ketones, alcohols, neutral organophosphorus compounds and trialkylamine oxides.

43. The process of claim 42, wherein the starting oxide mixture comprises the oxides of gallium and gadolinium.

44. The process of claim 5 wherein the extraction agent is a cationic extractant selected from the group consisting of organophosphorus acid, aliphatic acid, aromatic acid, halogen containing aliphatic, aromatic or cycloaliphatic acids, naphthenic acid, heavy acid fraction, sulfonic acid, versatic acid and beta-diketone.

45. The process of claim 44, wherein the starting oxide mixture comprises the oxides of gallium and gadolinium.

46. A process for the recovery of gallium and rare earth values from mixtures of the oxides thereof, comprising:
(i) acidulating and dissolving such admixtures in a nitrate acidic medium;
(ii) next liquid/liquid extracting the solution which results with a water-insoluble organic extraction agent into an aqueous phase and an organic phase, whereby said rare earth values are preferentially transferred from said aqueous phase to said organic phase; and
(iii) recovering said gallium and said rare earth values from the respective phases comprising same.

47. The process of claim 46 wherein said nitrate acidic medium comprises nitric acid.

48. The process as defined by claim 47, said acidic medium being at a boil.

49. The process as defined by claim 4, said acidic medium being both pure and concentrated.

50. The process as defined by claim 47, said acidulating and dissolving being conducted under reflux in such stoichiometric excess of acid that the residual acidity of the acidic medium, upon completion of the acidulation dissolution, is greater than 2N.

51. The process as defined by claim 46, the starting material oxide admixture being particulate, and the particles thereof having diameter sizes of less than 400 microns.

52. The process as defined by claim 46, said extraction agent being an anionic extractant selected from the group consisting of long-chain hydrocarbons comprising primary, secondary or tertiary amino functions, or quaternary ammonium, sulfonium or phosphonium salt functions.

53. The process as defined by claim 52, said anionic extractant being selected from the group consisting of:
(i) primary amines of the formula:

in which R is a hydrocarbon having from 18 to 24 carbon atoms;
(ii) secondary amines of the formula:

in which $R_1$, $R_2$ and $R_3$ are hydrocarbons, the sum of the total carbon atoms of which is from 12 to 14;
(iii) tertiary amines of the formula $R_3N$, in which R is a hydrocarbon having from 8 to 10 carbon atoms;
(iv) quaternary ammonium salts of the formula:

in which R is a hydrocarbon having from 8 to 10 carbon atoms and X is a chloride, nitrate or sulfate anion; and
(v) sulfonium salts of the general formula:

in which R is a hydrocarbon having from 10 to 18 carbon atoms and X is a chloride or nitrate anion.

54. The process as defined by claim 46, said extraction agent being a solvating extractant selected from the group consisting of esters, ethers, sulfoxides, ketones, alcohols, neutral organophosphorus compounds and trialkylamine oxides.

55. The process as defined by claim 54, said solvating extractant being selected from the group consisting of:
(i) esters of the general formula:

in which R₁ and R₂ are hydrocarbon radicals having at least 4 carbon atoms;
(ii) ethers of the general formula R₁—O—R₂, in which R₁ and R₂ are hydrocarbon radicals having at least 4 carbon atoms;
(iii) sulfoxides of the general formula:

in which R₁ and R₂ are hydrocarbon radicals having at least 4 carbon atoms;
(iv) ketones of the general formula:

in which R₁ and R₂ are hydrocarbon radicals having at least 4 carbon atoms;
(v) alcohols of the general formula ROH, in which R is a hydrocarbon radical having at least 4 carbon atoms;
(vi) neutral organophosphorus compounds of the general formulae:

in which R₁ and R₂ and R₃ represent hydrocarbon radicals having at least 4 carbon atoms; and
(vii) trialkylamine oxides of the general formula R₃NO, in which R is an aliphatic hydrocarbon radical having at least 4 carbon atoms.

56. The process as defined by claim 55 said solvating extractant being selected from the group consisting of ethyl acetate, butyl acetate, diethyl ether, isopropyl ether, di-n-butyl ether, di-n-pentylsulfoxide, di-n-octylsulfoxide, diphenylsulfoxide, diisopropyl ketone, methyl isobutyl ketone, mesityl oxide, cyclohexanol, n-hexan-1-ol, 2-ethylhexanol, n-heptanol, n-octanol, the stearyl and cetyl esters of phosphoric acid, tributyl phosphate, dibutyl butylphosphonate, 2-ethylhexyl bis-(2-ethylhexyl) phosphonate, butyl bis-(chloromethyl)-phosphonate, tri-n-octylphosphine oxide, and trioctylamine oxide.

57. The process as defined by claim 53, wherein said anionic extractant is selected from the group consisting of the tertiary amines and the quaternary ammonium salts.

58. The process as defined by claim 55, wherein said solvating extractant is selected from the group consisting of organophosphorus compounds and the sulfoxides.

59. The process as defined by claim 46, the solution resulting upon acidulation/dissolution further comprising a nonextractable neutral salt, the anion of which corresponding to that of the acidic medium the cation thereof being selected from the group consisting of alkali and alkaline earth metal, and aluminum.

60. The process as defined by claim 46, said organic phase further comprising a heavy alcoholic or heavy phenolic modifier.

61. The process as defined by claim 46, said organic extractant further comprising a diluent therefor.

62. The process as defined by claim 46, said extraction agent being an anionic or solvating extractant, and wherein the recovery (iii) from the organic phase comprises the liquid/liquid extraction thereof with an aqueous or weakly acidic aqueous solution, with either said gallium values or said rare earth values being transferred from said organic phase into the resulting second aqueous phase.

63. The process as defined by claim 62, said liquid/liquid extraction being with a weakly acidic aqueous solution, the concentration of H⁺ ions therein being 0.1N or less.

64. The process as defined by claim 46, the starting material oxide mixture comprising waste fines from the production of garnets.

65. The process as defined by claim 46, the starting material oxide mixture comprising mixed oxides of the following formulae:

in which RE is at least one element selected from the group consisting of gadolinium, yttrium, samarium and neodymium, A is selected from the group consisting of aluminium and scandium, α=±0.20, and 0≦x<1;

in which 0<x<0.5, y≧0, 0<z≦1.5, RE₁ is selected from the group consisting of samarium and europium in the trivalent state, and M is calcium;

in which 0≦x<1, RE is at least one element selected from the group consisting of gadolinium, samarium and neodymium, M is selected from the group consisting of calcium, strontium and magnesium, and A is selected from the group consisting of tin and zirconium;

in which 0.25<x<2, 0<y<1.5, RE is at least one element selected from the group consisting of yttrium, neodymium, samarium and gadolinium, A=Ga₁₋ₐMₐ with 0≦α<1, and M is selected from the group consisting of aluminum, indium and scandium;

in which 0<x≦5;

in which RE is at least one element selected from the group consisting of yttrium, gadolinium, lutetium and lanthanum, and M=Al₁₋ₓGaₓ with 0<x≦1;

in which M is an element selected from the group consisting of magnesium, calcium, barium and strontium, and $A = Ga_xAl_{1-x}$ with $0 < x \leq 1$; and $$MA_{12}O_{19}:Eu^{2+} \text{ or } (RE)MA_{11}O_{19}:Tb^{3+} \qquad (8)$$

in which M is an element selected from the group consisting of magnesium, calcium, strontium and barium, RE is at least one element selected from the group consisting of cerium in the trivalent state and gadolinium, and $A = Al_{1-x}GA_x$ with $0 < x \leq 1$.

66. The process of claim 46, wherein the starting material oxide mixture comprises waste fines from the production of gadolinium/gallium garnets.

67. The process of claim 46, wherein said extraction agent is a nitrate anionic extractant.

68. The process of claim 67, wherein said extraction agent is a quaternary ammonium salt anionic extractant.

69. The process of claim 46 wherein the rare earth values comprise gadolinium.

70. The process of claim 50, wherein the extraction agent is an anionic extractant selected from the group consisting of long-chain hydrocarbons comprising primary, secondary or tertiary amine functions, or quaternary ammonium, sulfonium or phosphonium salt functions.

71. The process of claim 70, wherein the starting oxide mixture comprises the oxides of gallium and gadolinium.

72. The process of claim 50, wherein the extraction agent is a solvating extractant selected from the group consisting of esters, ethers, sulfoxides, ketones, alcohols, neutral organophosphorus compounds and trialkylamine oxides.

73. The process of claim 72, wherein the starting oxide mixture comprises the oxides of gallium and gadolinium.

74. The process of claim 50, wherein the extraction agent is a cationic extractant selected from the group consisting of organophosphorus acid, aliphatic acid, aromatic acid, halogen containing aliphatic, aromatic or cycloaliphatic acids, naphthenic acid, heavy acid fraction, sulfonic acid, versatic acid and beta-diketone.

75. The process of claim 74, wherein the starting oxide mixture comprises the oxides of gallium and gadolinium.

76. The process as defined by claim 1, said extraction agent being a cationic extractant selected from the group consisting of organophosphorus acids; aliphatic or aromatic acids; halogen-containing aliphatic, aromatic, or cycloaliphatic acids; naphthene acids; heavy acid fractions; sulfonic acids; at least one acid having the general formula:

in which $R_1$ and $R_2$ are substituted or unsubstituted hydrocarbon radicals; and B-diketones.

77. The process as defined by claim 76, said cationic extractant being selected from the group consisting of:
(i) organophosphorus acids of the general formula:

in which $R_1$ and $R_2$ represent aliphatic or aromatic hydrocarbon radicals which are such that the total number of carbon atoms in $R_1$ and $R_2$ is equal to at least 10;

(ii) aliphatic acids in which the hydrocarbon radicals have from 3 to 20 carbon atoms;

(iii) halogen-containing aliphatic, aromatic, or cycloaliphatic acids;

(iv) naphthenic acids having the general formula:

in which $n > 1$;

(v) heavy acid fractions selected from the group consisting of mixtures of $C_5$-$C_6$, $C_7$-$C_9$, $C_9$-$C_{11}$, $C_{10}$-$C_{16}$, $C_{10}$-$C_{13}$, and $C_{12}$-$C_{16}$ acids;

(vi) di-nonylnaphthalene-sulfonic acid;

(vii)

(viii) at least one acid of the formula

(a) and derived from the carboxylation of $C_9$ olefins and in which $R_1$ and $R_2$ are hydrocarbon radicals in which the sum of the carbon atoms is equal to 7; or (b) derived by the oxo synthesis from $C_9$-$C_{11}$ olefins and being a mixture of saturated tertiary monocarboxylic acids in which $R_1$ and $R_2$ hydrocarbon radicals in which the sum of the carbon atoms is equal to 6, 7, or 8; and (ix) acetylacetone.

78. The process as defined by claim 77 wherein said extraction agent is selected form the group consisting of: bis-(2-ethylhexyl)-phosphoric acid; bis-(2-ethylhexyl)-phosphonic acid; and butanoic, valeric, octoic, caproic, caprylic, capric, pelargonic, and lauric acids.

79. The process as defined by claim 46, said extraction agent being a cationic extractant selected from the group consisting of organophosphorus acids; aliphatic or aromatic acids; halogen-containing aliphatic, aromatic, or cycloaliphatic acids; naphthene acids; heavy acid fractions; sulfonic acids; at least one acid having the general formula:

in which $R_1$ and $R_2$ are substituted or unsubstituted hydrocarbon radicals; and B-diketones.

80. The process as defined by claim 79, said cationic extractant being selected from the group consisting of:

(i) organophosphorus acids of the general formula:

in which $R_1$ and $R_2$ represent aliphatic or aromatic hydrocarbon radicals which are such that the total number of carbon atoms in $R_1$ and $R_2$ is equal to at least 10;

(ii) aliphatic acids in which the hydrocarbon radicals have from 3 to 20 carbon atoms;

(iii) halogen-containing aliphatic, aromatic, or cycloaliphatic acids;

(iv) naphthenic acids having the general formula:

in which n>1;

(v) heavy acid fractions selected from the group consisting of mixtures of $C_5$–$C_6$, $C_7$–$C_9$, $C_9$–$C_{11}$, $C_{10}$–$C_{16}$, $C_{10}$–$C_{13}$, and $C_{12}$–$C_{16}$ acids;

(vi) di-nonylnaphthalene-sulfonic acid;

(vii)

(viii) at least one acid of the formula (a) and derived from the carboxylation of $C_9$ olefins and in which $R_1$ and $R_2$ are hydrocarbon radicals in which the sum of the carbon atoms is equal to 7; or (b) derived by the oxo synthesis from $C_9$–$C_{11}$ olefins and being a mixture of saturated tertiary monocarboxylic acids in which $R_1$ and $R_2$ hydrocarbon radicals in which the sum of the carbon atoms is equal to 6, 7, or 8; and (ix) acetylacetone.

81. The process as defined by claim 80 wherein said extraction agent is selected form the group consisting of: bis-(2-ethylhexyl)-phosphoric acid; bis-(2-ethylhexyl)-phosphonic acid; and butanoic, valeric, octoic, caproic, caprylic, capric, pelargonic, and lauric acids.

* * * * *